United States Patent
Hwang et al.

(10) Patent No.: US 11,996,538 B2
(45) Date of Patent: May 28, 2024

(54) METHOD FOR PREPARING POSITIVE ELECTRODE ACTIVE MATERIAL PRECURSOR FOR LITHIUM SECONDARY BATTERY

(71) Applicant: LG Chem, Ltd., Seoul (KR)

(72) Inventors: Cho Hee Hwang, Daejeon (KR); Seong Bae Kim, Daejeon (KR); Kyoung Wan Park, Daejeon (KR); Eun Hee Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 571 days.

(21) Appl. No.: 17/296,667

(22) PCT Filed: Nov. 21, 2019

(86) PCT No.: PCT/KR2019/016014
§ 371 (c)(1),
(2) Date: May 25, 2021

(87) PCT Pub. No.: WO2020/111655
PCT Pub. Date: Jun. 4, 2020

(65) Prior Publication Data
US 2022/0029144 A1   Jan. 27, 2022

(30) Foreign Application Priority Data
Nov. 30, 2018  (KR) .................. 10-2018-0152270

(51) Int. Cl.
*H01M 4/04*   (2006.01)
*H01M 4/02*   (2006.01)
(Continued)

(52) U.S. Cl.
CPC ......... *H01M 4/0416* (2013.01); *H01M 4/505* (2013.01); *H01M 4/525* (2013.01); *H01M 10/0525* (2013.01); *H01M 2004/028* (2013.01)

(58) Field of Classification Search
CPC .... H01M 4/0416; H01M 4/505; H01M 4/525; H01M 4/0525; H01M 2004/028
See application file for complete search history.

(56) References Cited

U.S. PATENT DOCUMENTS

2012/0074351 A1  3/2012  Levasseur et al.
2013/0078520 A1  3/2013  Toya et al.
(Continued)

FOREIGN PATENT DOCUMENTS

| CN | 102884659 A | 1/2013 |
|---|---|---|
| JP | 2010192424 A | 9/2010 |

(Continued)

OTHER PUBLICATIONS

Extended European Search Report for Corresponding EP Application No. 19890277.7 dated Nov. 22, 2021, 2 pgs.
(Continued)

*Primary Examiner* — Matthew J Merkling
(74) *Attorney, Agent, or Firm* — Lerner David LLP

(57) ABSTRACT

A method for preparing a positive electrode active material precursor includes preparing a metal aqueous solution including a nickel raw material, a cobalt raw material, and a manganese raw material (step 1); adding the metal aqueous solution, an ammonium cation complex forming agent, and a basic aqueous solution into a reactor, co-precipitating the mixture at pH 11 to less than pH 12 to form nuclei of first positive electrode active material precursor particles and growing the nuclei (step 2); adjusting input amount of the basic aqueous solution to increase the pH in the reactor to a range of 0.8 to 1.5 compared to that of step 2; and adjusting input amount of the basic aqueous solution to change the pH in the reactor to pH 11 to less than pH 12 (step 4). A positive electrode active material precursor prepared by the above preparation method has an improved packing density.

14 Claims, 2 Drawing Sheets

(51) Int. Cl.
  *H01M 4/505* (2010.01)
  *H01M 4/525* (2010.01)
  *H01M 10/0525* (2010.01)

(56) References Cited

U.S. PATENT DOCUMENTS

| | | |
|---|---|---|
| 2013/0149608 A1 | 6/2013 | Kim et al. |
| 2013/0288129 A1 | 10/2013 | Toya et al. |
| 2014/0106228 A1* | 4/2014 | Toya ............... H01M 4/134 429/223 |
| 2015/0228977 A1 | 8/2015 | Toya et al. |
| 2016/0013480 A1 | 1/2016 | Sikha et al. |
| 2016/0085724 A1 | 3/2016 | Ishii |
| 2016/0087262 A1 | 3/2016 | Toya et al. |
| 2017/0012288 A1* | 1/2017 | Yamaji ............. H01M 4/505 |
| 2017/0324081 A1 | 11/2017 | Toya et al. |
| 2019/0214628 A1* | 7/2019 | Choi ............... C01G 53/006 |
| 2020/0335784 A1* | 10/2020 | Tong ............... H01M 4/04 |
| 2020/0381720 A1* | 12/2020 | Endo ............... C01G 53/00 |
| 2022/0009791 A1* | 1/2022 | Yang ............... H01M 4/0497 |
| 2022/0158185 A1* | 5/2022 | Yamauchi ......... H01M 4/505 |

FOREIGN PATENT DOCUMENTS

| | | |
|---|---|---|
| JP | 2011116583 A | 6/2011 |
| JP | 2012254889 A | 12/2012 |
| JP | 2013120752 A | 6/2013 |
| JP | 2013144625 A | 7/2013 |
| JP | 2015227263 A | 12/2015 |
| KR | 20120017004 A | 2/2012 |
| KR | 20130009739 A | 1/2013 |
| KR | 20160099876 A | 8/2016 |
| KR | 101748999 B1 | 6/2017 |
| KR | 101815779 B1 | 1/2018 |
| KR | 20180091754 A | 8/2018 |
| KR | 20180098735 A | 9/2018 |
| WO | 2014149766 A1 | 9/2014 |
| WO | 2016129733 A1 | 8/2016 |
| WO | 2018155746 A1 | 8/2018 |

OTHER PUBLICATIONS

International Search Report for Application No. PCT/KR2019/016014 dated Feb. 27, 2020, pp. 1-2.

* cited by examiner

METHOD FOR PREPARING POSITIVE ELECTRODE ACTIVE MATERIAL PRECURSOR FOR LITHIUM SECONDARY BATTERY

CROSS-REFERENCE TO RELATED APPLICATIONS

The present application is a national phase entry under 35 U.S.C. § 371 of International Application No. PCT/KR2019/016014 filed Nov. 21, 2019, which claims priority from Korean Application No. 10-2018-0152270, filed on Nov. 30, 2018, the disclosures of which are incorporated herein in their entirety by reference.

TECHNICAL FIELD

Technical Field

The present invention relates to a method for preparing a positive electrode active material precursor for lithium secondary battery, a positive electrode active material precursor prepared by the same, and a lithium secondary battery including the positive electrode active material precursor.

Background Art

As technology development and demand for mobile devices have increased, the demand for secondary batteries as an energy source has been rapidly increased. Among such secondary batteries, lithium secondary batteries having high energy density and voltage, long cycle life, and a low self-discharging rate have been commercialized and widely used.

As a positive electrode active material of a lithium secondary battery, a lithium transition metal composite oxide is used. Among such lithium transition metal composite oxides, a lithium cobalt composite metal oxide such as $LiCoO_2$ which has a high functional voltage and excellent capacity properties has been mainly used. However, $LiCoO_2$ has very poor thermal properties due to the destabilization of a crystal structure according to de-lithium. Also, $LiCoO_2$ is expensive, and thus, has a limitation in being used as a power source for electric vehicles or the like in a large amount.

As a material to replace $LiCoO_2$, a lithium manganese composite metal oxide ($LiMnO_2$, $LiMn_2O_4$, and the like), a lithium iron phosphate compound ($LiFePO_4$ and the like), or a lithium nickel composite metal oxide ($LiNiO_2$ and the like) and the like has been developed. Among the above materials, research and development has been actively conducted on a lithium nickel composite metal oxide which has a high reversible capacity of about 200 mAh/g, thereby easily implementing a high capacity battery. However, when compared with $LiCoO_2$, $LiNiO_2$ has a lower thermal stability, and has a problem in that when an internal short circuit occurs due to external pressure or the like in a charged state, a positive electrode active material itself is decomposed, causing the rupture and ignition of a battery. Accordingly, as a method for improving the thermal stability of $LiNiO_2$, which is low, while maintaining the excellent reversible capacity thereof, a lithium-nickel-cobalt metal oxide in which a part of Ni is substituted with Co, Mn or Al has been developed.

However, the lithium-nickel-cobalt metal oxide has a problem in that the capacity thereof is low. In order to increase the capacity of the lithium-nickel-cobalt metal oxide, a method for increasing the content of nickel or a method for increasing the packing density per unit volume of a positive electrode active material has been studied.

Typically, in order to prepare a high-density positive electrode active material having a high packing density per unit volume, a method in which each of a small-diameter precursor and a large-diameter precursor is prepared, and then mixed together and fired, or a method in which prepared precursors are separately recovered, mixed together, and then fired has been used. However, in this case, a separation device, a space, and the like are required to separate and recover each of a small-diameter precursor and a large-diameter precursor prepared and a separate mixing process is required, so that there has been a problem in that preparation costs and preparation time are increased.

Therefore, there has been a demand for developing a method for preparing a positive electrode active material precursor, the method capable of uniformly mixing a small-diameter precursor and a large-diameter precursor while reducing preparation costs and preparation time.

DISCLOSURE OF THE INVENTION

Technical Problem

The first aspect of the present invention provides a method for preparing a positive electrode active material precursor, the method capable of improving productivity by simultaneously preparing a small-diameter positive electrode active material precursor and a large-diameter positive electrode active material precursor in one reactor.

The second aspect of the present invention provides a positive electrode active material precursor prepared by the above method and having an excellent packing density per unit volume.

The third aspect of the present invention provides a positive electrode active material prepared by using the positive electrode active material precursor.

The fourth aspect of the present invention provides a positive electrode for lithium secondary battery including the positive electrode active material and a lithium secondary battery including the positive electrode.

Technical Solution

According to an aspect of the present invention, there is provided a method for preparing a positive electrode active material precursor, the method including Step 1 of preparing a metal aqueous solution including a nickel raw material, a cobalt raw material, and a manganese raw material, Step 2 of adding the metal aqueous solution, an ammonium cation complex forming agent, and a basic aqueous solution into a reactor, co-precipitating a resulting mixture at pH 11 to less than pH 13 to form nuclei of first positive electrode active material precursor particles and growing the nuclei, Step 3 of adjusting input amount of the basic aqueous solution to increase the pH in the reactor to a range of 0.8 to 1.5 compared to that of Step 2, thereby forming nuclei of second positive electrode active material precursor particles, and Step 4 of adjusting input amount of the basic aqueous solution to change the pH in the reactor to pH 11 to less than pH 12, thereby simultaneously growing the nuclei of first positive electrode active material precursor particles and the nuclei of second positive electrode active material precursor particles to prepare a positive electrode active material precursor of a bimodal type including the first positive electrode active material precursor particles and the second positive electrode active material precursor particles having different average particle diameters ($D_{50}$).

According to another aspect of the present invention, there is provided a positive electrode active material precursor prepared by the above preparation method, including first positive electrode active material precursor particles having an average particle diameter ($D_{50}$) of 7 μm or greater and second positive electrode active material precursor particles having an average particle diameter ($D_{50}$) of 2 μm to 7 μm at a weight ratio of 9:1 to 6:4, and having a tap density of 2.2 g/cc to 2.8 g/cc.

According to yet another aspect of the present invention, there is provided a positive electrode active material including a positive electrode active material precursor according to the present invention.

According to yet another aspect of the present invention, there are provided a positive electrode for lithium secondary battery, the positive electrode including a positive electrode active material according to the present invention, and a lithium secondary battery including the positive electrode.

Advantageous Effects

According to the present invention, although a positive electrode active material precursor is prepared in a single reactor, the pH at the time of a co-precipitation reaction is controlled, so that a bimodal-type positive electrode active material precursor having different average particle diameters ($D_{50}$) may be prepared. Accordingly, the packing density per unit volume is improved, so that a bimodal-type positive electrode active material precursor which may exhibit productivity and high-capacity properties may be provided.

In addition, when preparing a bimodal-type positive electrode active material precursor, it is possible to reduce the preparation process, thereby reducing preparation costs and preparation time compared to a typical process in which a large-diameter positive electrode active material precursor and a small-diameter positive active material precursor are prepared separately and then mixed together.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

BEST MODE FOR CARRYING OUT THE INVENTION

Figure 1:
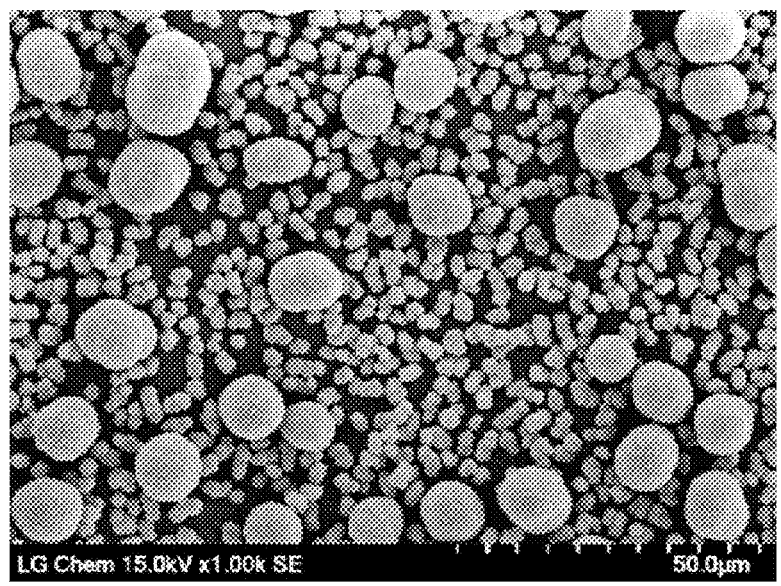
FIG. 1 is an SEM image of a positive electrode active material precursor prepared in Example 1 of the present invention.

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

Throughout the present specification, the term "tap density" refers to the apparent density of powder which is obtained by vibrating a container under predetermined conditions when filling the powder, and may be measured using a typical tap density measurement device. Specifically, the tap density may be measured in accordance with ASTM B527-06, and may be measured using TAS-2S (Logan Co., Ltd.).

In the present invention, an 'average particle diameter ($D_{50}$)' may be defined as a particle diameter corresponding to 50% of volume accumulation in a particle diameter distribution curve. The average particle diameter ($D_{50}$) may be measured by, for example, a laser diffraction method. For example, the average particle diameter ($D_{50}$) of a positive electrode active material may be measured by a method in which particles of the positive electrode active material are dispersed in a dispersion medium, and then introduced into a commercially available laser diffraction particle size measurement device (for example, Microtrac MT 3000) to be irradiated with ultrasonic waves of about 28 kHz to an output of 60 W. Thereafter, the average particle diameter ($D_{50}$) which corresponds to 50% of volume accumulation in the measurement device may be calculated.

Method for Preparing Positive Electrode Active Material Precursor

The present inventors have discovered that when preparing a positive electrode active material precursor using a single reactor, by controlling the pH during a reaction, it is possible not only to uniformly mix positive electrode active material particles in a bimodal form having different average particle diameters ($D_{50}$) but also to significantly increase the productivity of the positive electrode active material precursor, and have completed the present invention.

Specifically, in order to prepare a positive electrode active material precursor for lithium secondary battery, the positive electrode active material precursor of the present invention, there are included Step 1 of preparing a metal aqueous solution including a nickel raw material, a cobalt raw material, and a manganese raw material, Step 2 of adding the metal aqueous solution, an ammonium cation complex forming agent, and a basic aqueous solution into a reactor, co-precipitating the mixture at pH 11 to less than pH 13 to form nuclei of first positive electrode active material precursor particles and growing the nuclei, Step 3 of adjusting input amount of the basic aqueous solution to increase the pH in the reactor to a range of 0.8 to 1.5 compared to that of Step 2, thereby forming nuclei of second positive electrode active material precursor particles, and Step 4 of adjusting input amount of the basic aqueous solution to change the pH in the reactor to pH 11 to less than pH 12, thereby simultaneously growing the nuclei of first positive electrode active material precursor particles and the nuclei of second positive electrode active material precursor particles to prepare a positive electrode active material precursor of a bimodal type including the first positive electrode active material precursor particles and the second positive electrode active material precursor particles having different average particle diameters ($D_{50}$).

Hereinafter, a method for preparing a positive electrode active material precursor, the method according to the present invention will be described in detail.

First, Step 1 for preparing the positive electrode active material precursor according to the present invention is a step of preparing a metal aqueous solution including a nickel raw material, a cobalt raw material, and a manganese raw material.

The nickel raw material may be, for example, an acetate, a nitrate, a sulfate, a halide, a sulfide, a hydroxide, an oxide, or an oxyhydroxide, and the like, all containing nickel, specifically $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a combination thereof, but is not limited thereto.

The cobalt raw material may be an acetate, a nitrate, a sulfate, a halide, a sulfide, a hydroxide, an oxide, or an oxyhydroxide, and the like, all containing cobalt, specifically $Co(OH)_2$, $CoOOH$, $Co(OCOCH_3)_2 \cdot 4H_2O$, $Co(NO_3)_2 \cdot 6H_2O$, $CoSO_4$, $Co(SO_4)_2 \cdot 7H_2O$, or a combination thereof, but is not limited thereto.

The manganese-containing raw material may be an acetate, a nitrate, a sulfate, a halide, a sulfide, a hydroxide, an oxide, an oxyhydroxide, or a combination thereof, all containing manganese, specifically a manganese oxide such as $Mn_2O_3$, $MnO_2$, and $Mn_3O_4$, a manganese salt such as $MnCO_3$, $Mn(NO_3)_2$, $MnSO_4$, manganese acetate, dicarboxylic acid manganese, citric acid manganese, and fatty acid manganese salt, oxyhydroxide, manganese chloride, or a combination thereof, but is not limited thereto.

The metal aqueous solution may be prepared by adding a nickel-containing raw material, a cobalt-containing raw material, and a manganese-containing raw material to a solvent, specifically water, or a mixed solvent of water and an organic solvent (for example, alcohol, etc.) which may be uniformly mixed with water. Alternatively, the transition metal solution may be prepared by mixing an aqueous solution of a nickel-containing raw material, an aqueous solution of a cobalt-containing raw material, and an aqueous solution of a manganese-containing raw material.

Also, the metal-containing solution may selectively further include another metal element (M) if necessary in addition to nickel, manganese, and cobalt. At this time, M may include at least one selected from the group consisting of W, Mo, Cr, Al, Zr, Ti, Mg, Ta, and Nb.

When a first transition metal-containing solution and/or a second transition metal-containing solution further include the metal element (M), a raw material containing the metal element (M) may be selectively further included when preparing the first transition metal-containing solution and/or the second transition metal-containing solution.

As the raw material containing the metal element (M), at least one selected from the group consisting of an acetate, a nitrate, a sulfate, a halide, a sulfide, a hydroxide, an oxide, or an oxyhydroxide, all containing the metal element (M), may be used. For example, when the metal element (M) is W, a tungsten oxide or the like may be used.

By controlling the concentration of each of the nickel raw material, the cobalt raw material, and the manganese raw material included in the metal aqueous solution, it is possible to control the composition of a positive active material precursor to be finally prepared. For example, by controlling the concentration of each of the raw materials, it is possible to prepare a positive electrode active material precursor having the content of nickel of 60 mol % of the total metal content, in which case, it is possible to implement high-capacity properties due to the inclusion of high nickel (high-Ni).

Next, Step 2 for preparing the positive electrode active material precursor according to the present invention is a step of adding the metal aqueous solution, an ammonium cation complex forming agent, and a basic aqueous solution into a reactor, co-precipitating the mixture at pH 11 to less than pH 13, preferably at pH 11 to pH 12, to form nuclei of first positive electrode active material precursor particles and growing the nuclei.

Before introducing the metal aqueous solution, the ammonium cation complex forming agent, and the basic aqueous solution into the reactor, the ammonium cation complex forming agent and the basic aqueous solution may be first introduced to a predetermined volume of the reactor to control the pH inside the reactor.

The basic aqueous solution may include at least one selected from the group consisting of NaOH, KOH, and $Ca(OH)_2$, and as a solvent, water, or a mixture of an organic solvent which may be uniformly mixed with water and water may be used. At this time, the concentration of the basic aqueous solution may be 10 wt % to 30 wt %, preferably 20 wt % to 30 wt %. When the concentration of the basic aqueous solution is 10 wt % to 30 wt %, it takes a short time to form precursor particles and the yield thereof may also be excellent.

The ammonium cation complex forming agent may include at least one selected from the group consisting of $NH_4OH$, $(NH_4)_2SO_4$, $NH_4NO_3$, $NH_4Cl$, $CH_3COONH_4$, and $NH_4CO_3$. The ammonium cation complex forming agent may be used in the form of an aqueous solution. At this time, as a solvent, water, or a mixture of an organic solvent (for example, alcohol, etc.) which may be uniformly mixed with water and water may be used.

By adding the metal aqueous solution, the ammonium cation complex forming agent, and the basic aqueous solution into the reactor and subjecting the same to a co-precipitation reaction, it is possible to form the nuclei of first positive electrode active material precursor particles and grow the particles during a reaction time.

In other words, the basic aqueous solution and the ammonium cation complex forming agent are first introduced at an early stage of the reaction such that the pH is in the range of pH 11 to less than pH 13, and thereafter, a transition metal-containing solution may be introduced into the reactor to form the nuclei of the particles. At this time, since a pH value changes according to the generation of the nuclei of first positive electrode active material precursor particles due to the input of the metal aqueous solution, the basic aqueous solution and the ammonium cation complex forming agent may be continuously input together with the input of the metal aqueous solution to control the pH to be maintained at pH 11 to less than pH 13. When the above pH value range is satisfied, the generation of the nuclei of the particles and the grow thereof occur together, so that it is possible to grow the first positive electrode active material precursor particles during a reaction time. More preferably, at an early stage of the reaction, the pH in the reactor may be controlled to be pH 11.5 to less than pH 13, so that the reaction may proceed in the range such that the generation of the nuclei of the particles is more facilitated, and then the input amount of the basic aqueous solution and the input amount of the ammonium cation complex forming agent may be controlled to control the pH in the reactor to be pH 11 to pH 12, preferably pH 11 to pH 11.5, so that the reaction may proceed in the range such that the growth of the particles is more facilitated.

The pH for forming the nuclei of the first positive electrode active material precursor particles of Step 2 may be pH 11 to less than pH 13, preferably pH 11 to pH 12, most preferably pH 11.4 to pH 11.8.

In addition, Step 2 may be performed for 9 hours to 32 hours to grow the first positive electrode active material precursor particles. According to the control of the reaction time in Step 2, the growth of the first positive electrode active material precursor may be controlled, and the ratio of a first positive electrode active material included in the bimodal-type positive electrode active material precursor of the present invention may be controlled.

Next, Step 3 for preparing the positive electrode active material precursor according to the present invention is a step of adjusting the input amount of the basic aqueous solution to increase the pH in the reactor to a range of 0.8 to 1.5 compared to that of Step 2, thereby forming nuclei of second positive electrode active material precursor particles.

Specifically, the amount of the basic aqueous solution and the amount of ammonium cation complex forming agent to be introduced into a reactor in which the first positive electrode active material precursor is grown may be controlled to raise the pH in the reactor to be in a range of 0.8 to 1.5, preferably in a range of 0.8 to 1.2 compared to that of Step 2. For example, the pH of Step 3 may be pH 11.8 to pH 14.5, preferably pH 11.8 to 14.2, most preferably pH 12.2 to pH 13.0.

When the above pH range is satisfied, particle nuclei are preferentially generated and the grow of the particles hardly occurs. That is, when the pH of Step 3 is raised compared to that of Step 2, the first positive electrode active material precursor particles are not further grown, but the nuclei of the second positive electrode active material precursor particles are generated.

For example, when the pH of Step 3 and the pH of Step 2 are the same, the preparation effect of a bimodal precursor according to the pH change is not observed during a reaction. When the pH of Step 3 is lower than the pH of Step 2, the co-precipitation reaction of nickel is not smoothly performed, so that there may be a problem in that nickel may remain in a solution after the reaction, and accordingly, the content of nickel may be reduced so that capacity properties may be deteriorated when applied to a battery.

For example, Step 3 may be performed for 10 minutes to 1 hour.

By controlling the reaction time of Step 3, it is possible to control the generation ratio of the second positive electrode active material precursor nuclei.

That is, the bimodal-type precursor according to the present invention may control the ratio of the first positive electrode active material precursor particles and the second positive electrode active material precursor particles by controlling the reaction time of each of Step 2 and Step 3. Preferably, the reaction time of each of Step 2 and Step 3 may be controlled such that the first positive electrode active material precursor particles and the second positive electrode active material precursor particles are formed at a weight ratio of 9:1 to 6:4, preferably 8:2 to 7:3. For example, when the first positive electrode active material precursor particles and the second positive electrode active material precursor particles are included in the above ratio, the formation of small particles is facilitated when preparing a precursor, so that the packing density may be maximized and the filtering time may be reduced during a washing process.

Next, Step 4 for preparing the positive electrode active material precursor according to the present invention is a step of adjusting the input amount of the basic aqueous solution to change the pH in the reactor to pH 11 to less than pH 12, thereby simultaneously growing the nuclei of first positive electrode active material precursor particles and the nuclei of second positive electrode active material precursor particles to form the first positive electrode active material precursor particles and the second positive electrode active material precursor particles having different average particle diameters ($D_{50}$).

Specifically, after the nuclei of the second positive electrode active material precursor particles are formed, the amount of the basic aqueous solution and the amount of the ammonium cation complex forming agent to be introduced into the reactor may be controlled to control the pH in the reactor to be the pH of Step 1, for example, pH 11 to less than pH 12, preferably pH 11.4 to pH 11.8.

When the above pH range is satisfied, the growth of the particle preferentially occur, and the generation of the nuclei of new particles hardly occurs. That is, the nuclei of the first positive electrode active material precursor particles grown in Step 2 and the nuclei of the second positive electrode active material precursor particles grown in Step 3 may be simultaneously grown.

At this time, by controlling the reaction time of Step 4, it is possible to control the average particle diameter ($D_{50}$) of first positive electrode active material precursor particles and second positive electrode active material precursor particles to be finally prepared.

For example, the average particle diameter ($D_{50}$) of the first positive electrode active material precursor particles may be 7 µm or greater, preferably 7 µm to 15 µm.

For example, the average particle diameter ($D_{50}$) of the second positive electrode active material precursor particles may be 2 µm to 7 µm, preferably 3 µm to 5 µm.

Since the bimodal-type precursor according to the present invention includes the first positive electrode active material precursor particles and the second positive electrode active material precursor particles each having an average particle diameter ($D_{50}$) of the above ranges, a second positive electrode active material precursor having a relatively smaller average particle diameter ($D_{50}$) is positioned in an empty space of the first positive electrode active material precursor particles, so that the packing density per unit volume may be further increased, and accordingly, the productivity of a positive electrode active material precursor may be improved according to the improvement in the packing density per unit volume.

Next, a process of separating, washing and drying the obtained bimodal-type precursor may be further performed.

The washing step may be performed by, for example, introducing a lithium transition metal oxide into pure water, and then stirring the same. At this time, the temperature for the rinsing with water may be 20° C. or less, preferably 10° C. to 20° C., and the duration for the rinsing with water may be 10 minutes to 1 hour.

The drying is to dry the washing solution, and any method may be used without particular limitation as long as it is a method capable of drying the solution without causing a chemical change in the obtained positive active material precursor particles. For example, the drying may be performed by a spray drying method, a drying method using a rotary evaporator, a vacuum drying method, or a natural drying method.

Positive Electrode Active Material Precursor

In addition, the present invention provides a positive electrode active material precursor prepared by the above-described method for preparing a positive electrode active material precursor. Since the positive electrode active material precursor is prepared by the above-described preparation method, productivity for the same amount of time may be significantly improved.

Specifically, the positive electrode active material precursor prepared includes first positive electrode active material precursor particles having an average particle diameter ($D_{50}$) of 7 μm or greater and second positive electrode active material precursor particles having an average particle diameter ($D_{50}$) of 2 μm to 7 μm at a weight ratio of 9:1 to 6:4, and has a tap density of 2.2 g/cc to 2.8 g/cc, preferably 2.25 g/cc to 2.5 g/cc.

Since the positive electrode active material precursor according to the present invention is prepared in a single reactor, compared to a typical case in which a small-diameter precursor and a large-diameter precursor are respectively prepared in different reactors, separated, recovered, and then mixed to prepare a bimodal-type precursor, it is possible not only to improve productivity but also to reduce preparation costs and preparation time due to less separation device and space.

Also, the pellet density measured after the bimodal-type positive electrode active material precursor has been compressed at a rolling density of 1.5 kgf/cm$^2$ to 3.0 kgf/cm$^2$, preferably 2.0 kgf/cm$^2$ to 2.8 kgf/cm$^2$, most preferably 2.5 kgf/cm$^2$ to be prepared in the form of pellets may 2.8 g/cc to 3.3 g/cc, preferably 2.85 g/cc to 3.3 g/cc.

Positive Electrode Active Material and Method for Preparing Positive Electrode Active Material In addition, according to the present invention, a positive electrode active material prepared by using a positive electrode active material precursor prepared by the above-described preparation method may be provided. Specifically, by including positive electrode active materials having different average particle diameters ($D_{50}$), a positive electrode active material having an increased packing density per unit volume may be provided.

Specifically, in order to prepare the positive electrode active material, the above-described positive electrode active material precursor and a lithium-containing raw material may be mixed and fired to prepare a positive electrode active material.

The lithium-containing raw material is not particularly limited as long as it is a compound containing a lithium source. However, preferably, at least one selected from the group consisting of lithium carbonate ($Li_2CO_3$), lithium hydroxide (LiOH), $LiNO_3$, $CH_3COOLi$, and $Li_2(COO)_2$ may be used.

The positive electrode active material precursor and the lithium-containing raw material may be mixed at a molar ratio of 1:0.8 to 1:1.5. If the lithium-containing raw material is mixed in a range less than the above range, the capacity of a positive electrode active material to be prepared may be deteriorated. If the lithium-containing raw material is mixed in a range greater than the above range, particles may be sintered in a firing process, so that it may be difficult to prepare a positive electrode active material, and the deterioration in capacity and the separation of positive electrode active material particles after firing may be occur.

The firing may be performed at a temperature of 600° C. to 1,000° C. When the firing temperature is less than 600° C., the raw material remains in particles due to an insufficient reaction, so that the high-temperature stability of a battery may be deteriorated, and volume density and crystallinity may be deteriorated, so that structural stability may be reduced. Meanwhile, when the firing temperature is greater than 1,000° C., particles may grow non-uniformly, and since the size of particles becomes great, the amount of particles which may be included per unit area is reduced, so that the volume capacity of the battery may be deteriorated. Meanwhile, when considering the particle size control, capacity, and stability of a positive electrode active material to be prepared and the reduction in lithium-containing by-products, the firing temperature may be more preferably 700° C. to 900° C.

The firing may be performed for 5 hours to 50 hours. When the firing time is less than 5 hours, the reaction time is too short to obtain a high-crystalline positive electrode active material. When greater than 50 hours, the size of particles may excessively increase and the productivity efficiency may be deteriorated.

Positive Electrode

In addition, the present invention provides a positive electrode for lithium secondary battery, the positive electrode including a positive electrode active material prepared by the method described above.

Specifically, the positive electrode for secondary battery includes a positive electrode current collector and a positive electrode active material layer formed on the positive electrode current collector, wherein the positive electrode active material layer provides the positive electrode for lithium secondary battery including the positive electrode active material according to the present invention.

At this time, the positive electrode active material is the same as that described above, and thus, a detailed description thereof will be omitted. Hereinafter, only the rest of the components will be described in detail.

The positive electrode current collector is not particularly limited as long as it has a conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3-500 μm, and microscopic irregularities may be formed on the surface of the current collector to improve the adhesion of the positive electrode active material. For example, the positive electrode current collector may be used in various forms such as a film, a sheet, a foil, a net, a porous body, a foam, and a non-woven body.

The positive electrode active material layer may include a conductive material and, if necessary, selectively a binder, together with the positive electrode active material.

At this time, the positive electrode active material may be included in an amount of 80-99 wt %, more specifically 85-98.5 wt % based on the total weight of the positive electrode active material layer. When included in the above content range, excellent capacity properties may be exhibited.

The conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 0.1-15 wt % based on the total weight of the positive electrode active material layer.

The binder serves to improve the bonding between positive electrode active material particles and the adhesion between the positive electrode active material and the current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 0.1-15 wt % based on the total weight of the positive electrode active material layer.

The positive electrode may be manufactured according to a typical method for manufacturing a positive electrode except that the positive electrode active material described above is used. Specifically, the positive electrode may be manufactured by applying a composition for forming a positive electrode active material layer, which has been prepared by dissolving or dispersing the positive electrode active material described above and selectively, a binder and a conductive material in a solvent, on a positive electrode current collector, followed by drying and roll-pressing.

The solvent may be a solvent commonly used in the art. Examples of the solvent may include dimethyl sulfoxide (DMSO), isopropyl alcohol, N-methylpyrrolidone (NMP), acetone, or water, and any one thereof or a mixture of two or more thereof may be used. The amount of the solvent to be used is sufficient if the solvent may dissolve and disperse the positive electrode active material, the binder, and the conductive material in consideration of the applying thickness of a slurry and preparation yield, and thereafter, have a viscosity which may exhibit excellent thickness uniformity during application for manufacturing a positive electrode.

In addition, in another method, the positive electrode may be manufactured by casting the composition for forming a positive electrode active material layer on a separate support and then laminating a film obtained by being peeled off from the support on a positive electrode current collector.

Lithium Secondary Battery

In addition, the present invention may manufacture an electrochemical device including the positive electrode. The electrochemical device may be specifically a battery, a capacitor, or the like, and more specifically, may be a lithium secondary battery.

Specifically, the lithium secondary battery includes a positive electrode, a negative electrode positioned to face the positive electrode, a separator interposed between the positive electrode and the negative electrode, and an electrolyte. The positive electrode is the same as that described above, and thus, a detailed description thereof will be omitted. Hereinafter, only the rest of the components will be described in detail.

Also, the lithium secondary battery may selectively further include a battery case for accommodating an electrode assembly composed of the positive electrode, the negative electrode, and the separator, and a sealing member for sealing the battery case.

In the lithium secondary battery, the negative electrode includes a negative electrode current collector and a negative electrode active material layer positioned on the negative electrode current collector.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 µm to 500 µm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The negative electrode active material layer selectively includes a binder and a conductive material in addition to a negative electrode active material.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO_\beta$ ($0<\beta<2$), $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, mesocarbon microbeads, mesophase pitches, and high-temperature sintered carbon such as petroleum or coal tar pitch derived cokes.

The negative electrode active material may be included in an amount of 80 parts by weight to 99 parts by weight based on the total weight of a negative electrode active material layer.

The binder is a component for assisting in bonding between a conductive material, an active material, and a current collector, and is typically added in an amount of 0.1 parts by weight to 10 parts by weight based on the total weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a negative electrode active material, and may be added in an amount of 10 parts by weight or less, preferably 5 parts by weight or less based on the total weight of a negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

For example, the negative electrode active material layer may be prepared by applying a composition for forming a negative electrode active material layer, which is prepared by dissolving or dispersing a negative electrode active material and selectively a binder and a conductive material in a solvent, on a negative electrode current collector, following by drying. Alternatively, the negative electrode active material layer may be prepared by casting the composition for forming a negative electrode active material on a separate support, and then laminating a film peeled off from the support on a negative electrode current collector.

The negative electrode active material layer may be prepared by applying a composition for forming a negative electrode active material layer, which is prepared by dissolving or dispersing a negative electrode active material and selectively a binder and a conductive material in a solvent, on a negative electrode current collector, following by drying, or may be prepared by casting the composition for forming a negative electrode active material on a separate support, and then laminating a film peeled off from the support on a negative electrode current collector.

Meanwhile, in the lithium secondary battery, a separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used. Also, a coated separator including a ceramic component or a polymer material may be used to secure heat resistance or mechanical strength, and may be selectively used in a single-layered or a multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable. In this case, the performance of the electrolyte may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$, or the like may be used as the lithium salt. The lithium salt may be used in a concentration range of 0.1-2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, one or more kinds of additives, for example, a halo-alkylene carbonate-based compound such as difluoroethylene carbonate, pyridine, triethylphosp.hite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included. At this time, the additive may be included in an amount of 0.1-5 parts by weight based on the total weight of an electrolyte.

The lithium secondary battery including the positive electrode active material according to the present invention as describe above stably exhibits excellent discharging capacity, output properties, and lifespan properties, and thus, are useful for portable devices such as a mobile phone, a notebook computer, and a digital camera, and in the field of electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium- and large-sized battery module including a plurality of battery cells.

Mode for Carrying Out the Invention

Hereinafter, the present invention will be described in more detail with reference to embodiments. However, the embodiments according to the present invention may be modified into other various forms, and the scope of the present invention should not be construed as being limited to the embodiments described below. The embodiments of the present invention are provided to more fully describe the present invention to those skilled in the art.

EXAMPLES

Example 1

A metal aqueous solution having a concentration of 2.4 M was prepared by mixing $NiSO_4·6H_2O$, $CoSO_4·7H_2O$, and $MnSO_4·H_2O$ in water in an amount such that the molar ratio of nickel:cobalt:manganese is 7:1:2.

Thereafter, deionized water was added in an amount corresponding to 35 vol % of a co-precipitation reactor (capacity 40 L), and then nitrogen gas was purged in the reactor at a rate of 15 L/min to remove dissolved oxygen in the water and create a non-oxidizing atmosphere inside the reactor. Thereafter, 0.026 L of NaOH aqueous solution having a concentration of 25 wt % and 1.38 L of an $NH_4OH$ aqueous solution having a concentration of 9 wt % were added thereto, and the mixture was mixed at a stirring rate of 550 rpm at 50° C.

Thereafter, the metal aqueous solution and the NH4OH aqueous solution were continuously introduced into the reactor at a rate of 1.89 L/hr and 0.31 L/hr, respectively, using a metering pump, and the NaOH aqueous solution was introduced into the reactor by being interlocked with the pump through a pH control equipment such that the pH in the reactor was maintained at pH 11.6. To form nuclei of first positive electrode active material precursor particles and grow the same, the reaction was maintained for 32 hours.

Thereafter, the input flow rate of the NaOH aqueous solution was controlled to change the pH in the reactor to be pH 12.6 and the reaction was performed for 33 minutes to form nuclei of the second positive electrode active material precursor particles.

Thereafter, the input flow rate of the NaOH aqueous solution was controlled to change the pH in the reactor to be pH 11.6, and the reaction was maintained for 47.5 hours to grow the nuclei of the first positive electrode active material precursor particles and the nuclei of the second positive electrode active material precursor particles, thereby preparing first positive active material precursor particles having an average particle diameter ($D_{50}$) of 10.88 μm and second positive electrode active material precursor particles having an average particle diameter ($D_{50}$) of 3.22 μm.

After the reaction was completed, precursor particles generated were separated and washed, and then dried in an oven at 120° C. to prepare a bimodal-type positive electrode active material precursor. At this time, the first positive electrode active material precursor particles and the second positive electrode active material precursor particles were formed at a weight ratio of 8:2.

Example 2

A positive electrode active material precursor was prepared in the same manner as in Example 1 except that the formation of the nuclei of second positive electrode active material precursor particles was performed at pH 12.9 and first positive electrode active material precursor particles having an average particle diameter ($D_{50}$) of 10.07 μm and second positive electrode active material precursor particles having an average particle diameter ($D_{50}$) of 3.01 μm were prepared at a weight ratio of 8:2.

Comparative Example 1

A small-diameter positive electrode active material precursor and a large-diameter positive electrode active material precursor were separately prepared and then mixed to prepare a bimodal-type precursor.

First, in order to prepare the small-diameter positive electrode active material precursor, a metal aqueous solution having a concentration of 2.4 M was prepared by mixing $NiSO_4·6H_2O$, $CoSO_4·7H_2O$, and $MnSO_4·H_2O$ in water in an amount such that the molar ratio of nickel:cobalt:manganese is 7:1:2. Thereafter, deionized water was added in an amount corresponding to 35 vol % of a co-precipitation reactor (capacity 40 L), and then nitrogen gas was purged in the reactor at a rate of 15 L/min to remove dissolved oxygen in the water and create a non-oxidizing atmosphere inside the reactor. Thereafter, 0.032 L of NaOH aqueous solution having a concentration of 25 wt % and 1.03 L of an $NH_4OH$ aqueous solution having a concentration of 9 wt % were added thereto, and the mixture was mixed at a stirring rate of 550 rpm at 50° C. At this time, the pH in the reactor was pH 13. Thereafter, the metal aqueous solution and the $NH_4OH$ aqueous solution were continuously introduced into the reactor at a rate of 8.01 L/hr and 1.15 L/hr, respectively, using a metering pump, and the NaOH aqueous solution was introduced into the reactor by being interlocked with the pump through a pH control equipment such that the pH in the reactor was maintained at pH 11.6. The reaction was maintained for 9 hours. After the reaction was completed, nickel-cobalt-manganese precursor particles generated were separated and washed, and then dried in an oven at 120° C. to prepare a small-diameter positive electrode active material precursor (average particle diameter: 3.59 μm).

Thereafter, in order to prepare the large-diameter positive electrode active material precursor, the same method for preparing the small-diameter positive electrode active material precursor was used except that the input amount of raw materials introduced into the reactor, the co-precipitation reaction time, and the like were controlled. Specifically, 0.026 L of NaOH aqueous solution having a concentration of 25 wt % and 1.38 L of an $NH_4OH$ aqueous solution having a concentration of 9 wt % were introduced into a reactor in which a non-oxidizing atmosphere was created, and the mixture was mixed at a stirring rate of 550 rpm at 50° C. Thereafter, the metal aqueous solution and the $NH_4OH$ aqueous solution were continuously introduced into the reactor at a rate of 1.89 L/hr and 0.31 L/hr, respectively, using a metering pump, and the NaOH aqueous solution was introduced into the reactor by being interlocked with the pump through a pH control equipment such that the pH in the reactor was maintained at pH 11.6. The reaction was maintained for 80 hours. Nickel-cobalt-manganese precursor particles generated was separated and washed, and the dried in an oven at 120° C. to prepare a large-diameter positive electrode active material precursor (average particle diameter: 11.17 µm).

The small-diameter positive electrode active material precursor and the large-diameter positive electrode active material precursor prepared above were mixed at a ratio of 2:8 (wt %) to prepare a bimodal-type precursor.

Comparative Example 2

A positive electrode active material precursor was prepared in the same manner as in Example 1 except that the pH in the reactor was not changed but maintained at pH 11.6 throughout the reaction.

Comparative Example 3

A positive electrode active material precursor was prepared in the same manner as in Example 1 except that the formation of the nuclei of the second positive electrode active material precursor particles was performed at pH 12.1.

Experimental Example 1

Evaluation of Properties of Positive Electrode Active Material Precursor

The positive electrode active material precursor particles prepared in each of Examples 1 and 2 and Comparative Examples 1 to 3 were evaluated for particle properties.

1) SEM Photograph

The positive electrode active material precursors prepared in each of Example 1 and Comparative Examples 1 and 2 were photographed with a scanning electron microscope to identify the particle properties the positive electrode active material precursor generated.

Figure 2:
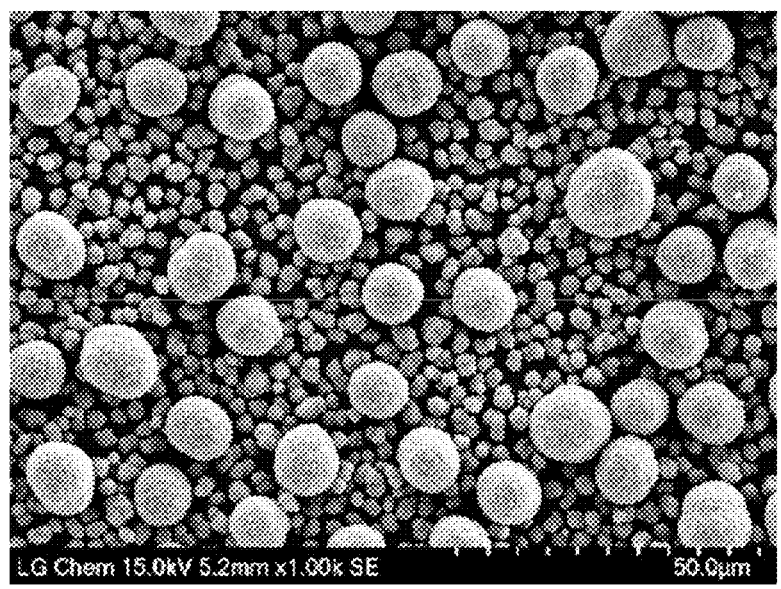
FIG. 2 is an SEM image of a positive electrode active material precursor prepared in Comparative Example 1.
Figure 3:
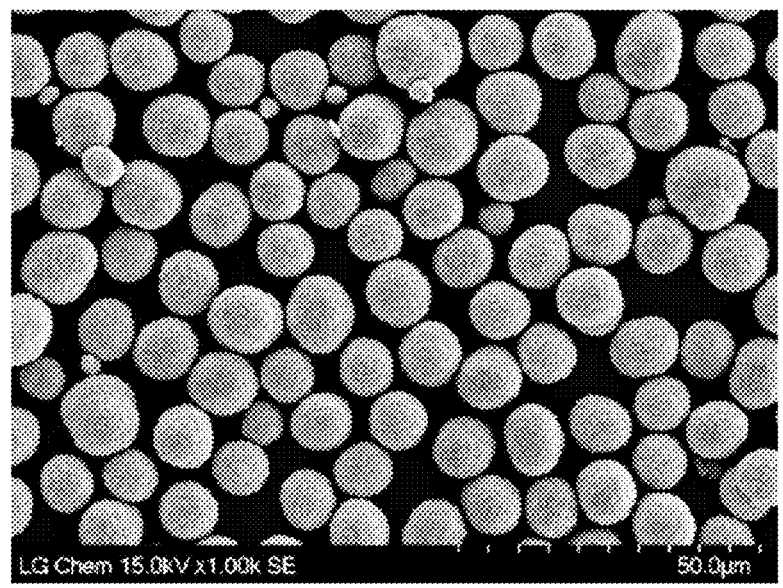
FIG. 3 is an SEM image of a positive electrode active material precursor prepared in Comparative Example 2.

FIGS. 1 to 3 are SEM photographs of the positive active material precursors prepared in each of Example 1 and Comparative Examples 1 and 2. As shown in FIG. 1 and FIG. 2, it was confirmed that even though positive electrode active material precursor particles were prepared by controlling the pH in a single reactor as in Example 1 of the present invention, a bimodal-type positive electrode active material precursor including a large-diameter positive electrode active material precursor and a small-diameter positive electrode active material precursor were formed as in Comparative Example 1. Meanwhile, when precursor particles are formed at a predetermined pH as in Comparative Example 2, it was confirmed that a positive electrode active material precursor having a uniform particle size was formed.

2) Evaluation of Tap Density 50 g of the positive active material precursor obtained in each of Examples 1 and 2 and Comparative Examples to 3 was filled in a 100 cc container, and then the apparent density of particles obtained by vibrating under predetermined conditions was measured. Specifically, the tap density of the positive electrode material was measured using a tap density tester (KYT-4000, Seishin Co., Ltd). The measurement results are shown in Table 1 below.

3) Evaluation of Pellet Density

The positive electrode active material precursor particles prepared in each of Examples 1 and 2 and Comparative Examples 1 to 3 were compressed at a rolling density of 2.5 kgf/cm$^2$ to be prepared in the form of pellets, and then the density of a positive electrode active material precursor was measured using a pellet density identification device (4350L, Carver Co., Ltd.). The measurement results are shown in Table 1 below.

TABLE 1

|  | Tap density (g/cc) | Pellet density (g/cc) |
|---|---|---|
| Example 1 | 2.30 | 2.88 |
| Example 2 | 2.32 | 2.88 |
| Comparative Example 1 | 2.17 | 2.81 |
| Comparative Example 2 | 2.08 | 2.73 |
| Example 3 | 2.13 | 2.82 |

As shown in Table 1, the tap density and the pellet density of the positive electrode active material precursor prepared in each of Examples 1 and 2 were excellent compared to those of the positive electrode active material precursor prepared in each of Comparative Examples 1 to 3.

Experimental Example 2

Identification of Particle Size Distribution

In order to identify the particle size distribution of the positive electrode active material precursor prepared in each of Example 1 and 2 and Comparative Examples 1 to 3, the particle size of the positive electrode active material precursor prepared in each of Examples 1 and 2 and Comparative Examples 1 to 3 was measured using a particle size distribution identification device (S-3500, Microtrac Co., Ltd.), and the results are shown in Table 2 and FIG. 4 below.

TABLE 2

|  | $D_{10}$ (µm) | $D_{50}$ (µm) | $D_{90}$ (µm) | $(D_{90} - D_{10})/D_{50}$ |
|---|---|---|---|---|
| Example 1 | 3.31 | 10.13 | 14.90 | 1.14 |
| Example 2 | 3.03 | 9.36 | 13.52 | 1.12 |
| Comparative Example 1 | 6.84 | 10.13 | 13.89 | 0.70 |
| Comparative Example 2 | 9.12 | 11.17 | 14.30 | 0.46 |
| Comparative Example 3 | 8.35 | 10.61 | 14.11 | 0.54 |

Figure 4:
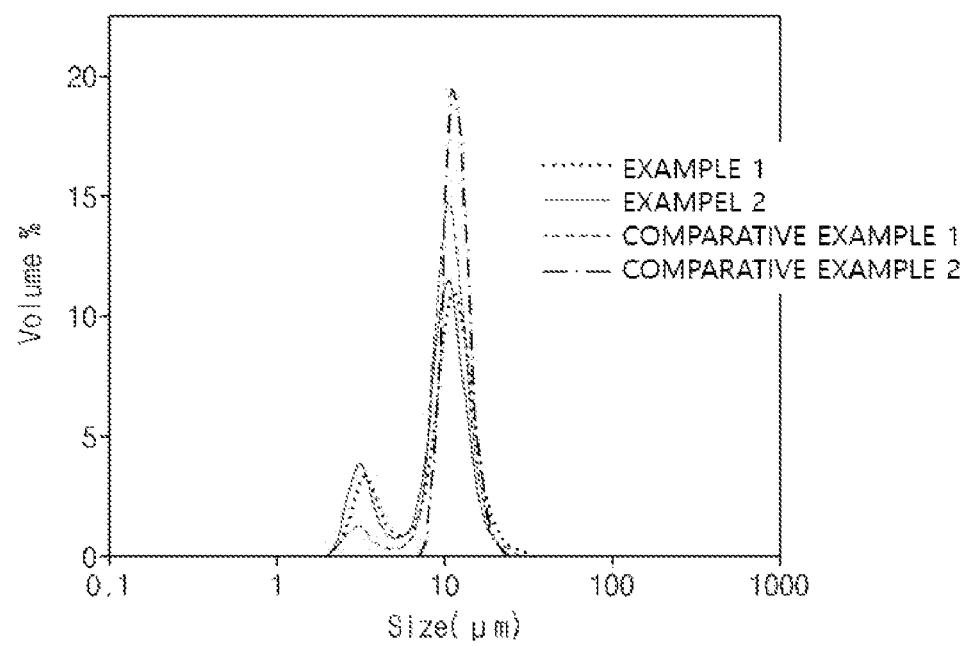
FIG. 4 is a graph showing the volume average particle size distribution of a positive electrode active material precursor prepared in each of Examples 1 to 2 and Comparative Examples 1 to 2.

As shown in Table 2 and FIG. 4, it was confirmed that the positive electrode active material precursor prepared in each of Examples 1 and 2 exhibited a bimodal-type particle size distribution as in the case of the positive electrode active material precursor of Comparative Example 1 in which large-diameter precursors and small-diameter precursors were respectively prepared in different reactors and then mixed at a weight ratio of 8:2.

However, in the case of Comparative Example 2 in which a first precursor nucleus was generated and the pH was not changed and in the case of Comparative Example 3 in which the pH was changed after the first precursor nucleus was generated but the pH change range was less than the range of the present invention, it was confirmed that a bimodal-type particle size distribution was not exhibited.

The invention claimed is:

1. A method for preparing a positive electrode active material precursor, the method comprising:
   Step 1 of preparing a metal aqueous solution including a nickel raw material, a cobalt raw material, and a manganese raw material;
   Step 2 of adding the metal aqueous solution, an ammonium cation complex forming agent, and a basic aqueous solution into a reactor, co-precipitating a resulting mixture at pH 11 to less than pH 13 to form nuclei of first positive electrode active material precursor particles and growing the nuclei;
   Step 3 of adjusting input amount of the basic aqueous solution to increase the pH in the reactor to a range of 0.8 to 1.5 compared to the pH of the Step 2, thereby forming nuclei of second positive electrode active material precursor particles; and
   Step 4 of adjusting input amount of the basic aqueous solution to change the pH in the reactor to pH 11 to less than pH 12, thereby simultaneously growing the nuclei of first positive electrode active material precursor particles and the nuclei of second positive electrode active material precursor particles to prepare a positive electrode active material precursor of a bimodal type including the first positive electrode active material precursor particles and the second positive electrode active material precursor particles having different average particle diameters ($D_{50}$).

2. The method of claim 1, wherein the pH of the Step 2 is pH 11 to pH 12.

3. The method of claim 1, wherein the pH of the Step 3 is increased to a range of 0.8 to 1.2 compared to the pH of the Step 2.

4. The method of claim 1, wherein the pH of the Step 3 is pH 12.2 to pH 13.0.

5. The method of claim 1, wherein a reaction time of the Step 2 and a reaction time of the Step 3 are adjusted such that the first positive electrode active material precursor particles and the second positive electrode active material precursor particles are formed at a weight ratio of 9:1 to 6:4.

6. The method of claim 1, wherein the Step 2 is performed for 9 hours to 32 hours.

7. The method of claim 1, wherein the Step 3 is performed for 10 minutes to 1 hour.

8. The method of claim 1, wherein the first positive electrode active material precursor particles have an average particle diameter ($D_{50}$) of 7 μm or greater.

9. The method of claim 1, wherein the second positive electrode active material precursor particles have an average particle diameter ($D_{50}$) of 2 μm to 7 μm.

10. A positive electrode active material precursor prepared by the method according to claim 1, comprising first positive electrode active material precursor particles having an average particle diameter ($D_{50}$) of 7 μm or greater and second positive electrode active material precursor particles having an average particle diameter ($D_{50}$) of 2 μm to 7 μm at a weight ratio of 9:1 to 6:4, and having a tap density of 2.2 g/cc to 2.8 g/cc.

11. The positive electrode active material precursor of claim 10, wherein a pellet density measured after the positive electrode active material precursor has been compressed at a rolling density of 1.5 kgf/cm$^2$ to 3.0 kgf/cm$^2$ to be prepared in a form of pellets is 2.8 g/cc to 3.3 g/cc.

12. A positive electrode active material comprising the positive electrode active material precursor according to claim 10.

13. A positive electrode for a lithium secondary battery, the positive electrode comprising the positive electrode active material according to claim 12.

14. A lithium secondary battery comprising the positive electrode according claim 13.

* * * * *